United States Patent [19]
Mackall, Jr. et al.

[11] 4,363,591
[45] Dec. 14, 1982

[54] TOWING ATTACHMENT FOR VEHICLES

[76] Inventors: Kenneth Mackall, Jr., 7438 Depot St., Rogers, Ohio 44455; Richard Noling, 45635 Crestview Dr., New Waterford, Ohio 44445

[21] Appl. No.: 219,317

[22] Filed: Dec. 22, 1980

[51] Int. Cl.³ .............................................. B60P 3/12
[52] U.S. Cl. .................................... 414/563; 212/181
[58] Field of Search ......................... 414/563; 280/402

[56] References Cited
U.S. PATENT DOCUMENTS 3,620,393 11/1971 Bubik .............................. 280/402 X
3,923,170 12/1975 Marquis ............................. 414/563

Primary Examiner—Robert G. Sheridan
Attorney, Agent, or Firm—Harpman & Harpman

[57] ABSTRACT

A vehicle towing and lifting attachment mounted on a vehicle by clamps has a belt and bar support system for the vehicle being towed, a hydraulic piston and cylinder actuated arm engaging the support system and a locking means for the hydraulic piston and cylinder actuated arm when in extended position.

5 Claims, 4 Drawing Figures

TOWING ATTACHMENT FOR VEHICLES

BACKGROUND OF THE INVENTION

1. Field of the Invention

This invention relates to towing devices for use on trucks for lifting and towing passenger cars or similar vehicles.

2. Description of the Prior Art

A number of towing devices have been developed for use with vehicles other than conventional tow trucks. Most of these devices use a combination of pivoted arms, chains, bars and hydraulic piston and cylinder assemblies. See for example U.S. Pat. Nos. 3,620,393 and 3,923,170.

In U.S. Pat. No. 3,620,393 a vehicle towing assembly is disclosed having a single boom from which a pair of towing belts extend, the free ends of which are independently secured to a vehicle to be towed.

In U.S. Pat. No. 3,923,170 a lifting boom for trucks is shown wherein a boom is pivotally secured on a frame mounted to the undercarriage of a towing vehicle. A chain suspended from the beam is attached to the vehicle to be towed.

In applicant's invention a pair of vertically spaced parallel bars having flexible belts therebetween are secured to a support frame and arm assembly that is attached to a channel which is positioned on the truck in place of the conventional bumper.

SUMMARY OF THE INVENTION

A vehicle towing and lifting attachment for use on trucks or similar vehicles to tow passenger cars comprises a frame detachably mounted on a channel that replaces the usual bumper. A lifting arm is pivotally secured to the frame and a pair of vertically spaced parallel bars are respectively pivoted to the channel and the lifting arm and are interconnected by flexible belts so as to be engagable with a portion of the vehicle being towed. Chains are attached to the ends of one of said bars for securing the towed vehicle thereto. A hydraulic piston and cylinder assembly is positioned between said frame and lifting arm together with a locking device.

DESCRIPTION OF THE PREFERRED EMBODIMENT

Figure 1:
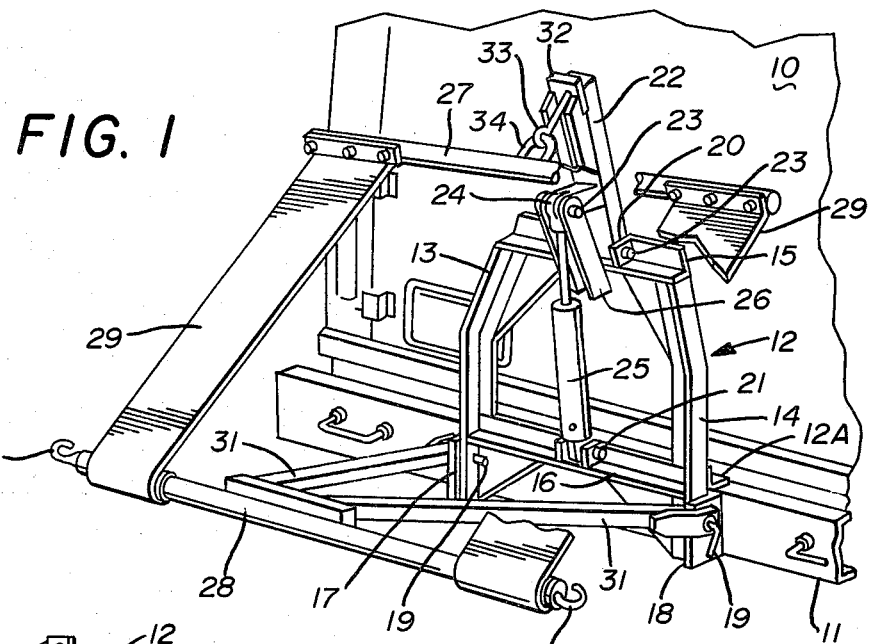
FIG. 1 is a perspective view of the towing attachment secured to a truck.

A towing attachment for a vehicle such as a truck is illustrated in FIG. 1 of the drawings mounted on a truck in place of the usual rear bumper. The attachment comprises a channel member 11 secured to the truck 10 and a detachable vertically positioned support frame 12 having horizontally spaced side members 13 and 14 and horizontally positioned upper and lower frame members 15 and 16.

Figure 2:
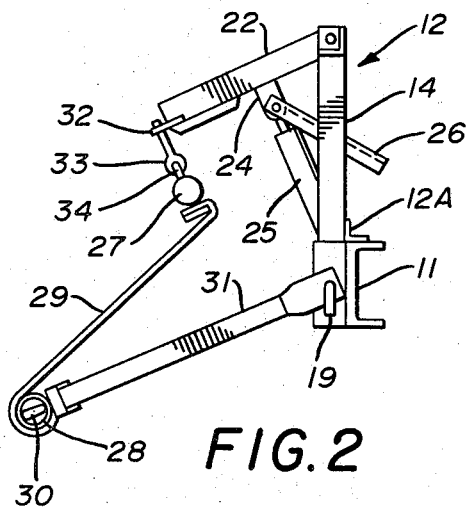
FIG. 2 is a side elevation of the towing attachment shown in FIG. 1 with parts thereof in a lowered position.
Figure 3:
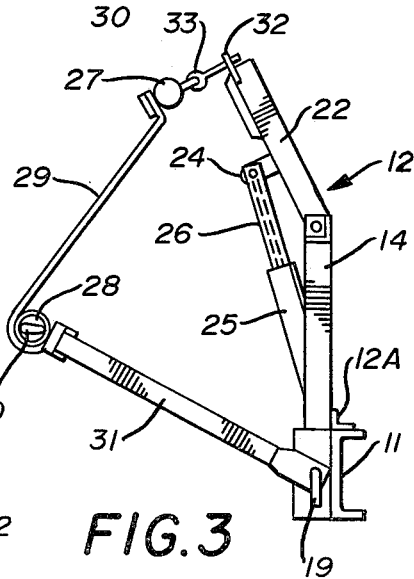
FIG. 3 is a side elevation of the towing attachment with a portion thereof in elevated position.
Figure 4:
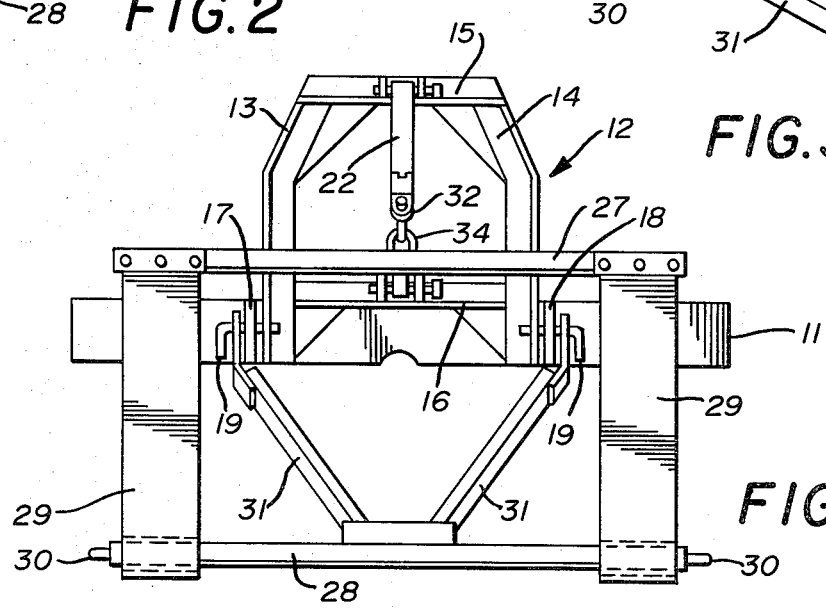
FIG. 4 is a plan view of the towing attachment with parts in their lowermost position.

A pair of spaced apertured flanges 17 and 18 detachably connect the support frame 12 to the channel 11 by pins 19. A pair of apertured brackets 20 and 21 respectively are positioned on each of the upper and lower frame members 15 and 16 midway of their ends. A lifting arm 22 is pivoted at its lower end by a pin 23 in the apertured bracket 20. A pair of apertured lugs 24 are formed on the underside of the lifting arm 22. A hydraulic piston and cylinder assembly 25 is pivotally connected between the lugs 24 on the lifting arm 22 and the apertured bracket 21 on the frame 12 so as to raise and lower the lifting arm 22 when activated by a source of fluid pressure, see FIGS. 2 and 3 of the drawings. A locking member 26 in the form of a channel with a bifurcated end is pivoted to the lifting arm 22 by the lugs 24 and is movable to a first position alongside the piston rod of the piston and cylinder assembly 25 when the rod is extended so as to engage the upper end of the cylinder of the piston and cylinder assembly 25 thereby locking the lifting arm 22 in raised position as seen in FIG. 3 of the drawings. The locking member 26 is movable to a second position as seen in FIG. 2 of the drawings, out of engagement with the cylinder of the piston and cylinder assembly 25 so that the lifting arm 22 may be lowered.

Referring now to FIG. 1 of the drawings, the towing attachment will be seen to have a pair of spaced parallel bars 27 and 28 with flexible straps 29 extending between the opposite ends of said bars. The lower bar 28 has hooks 30 on its ends from which chains, not shown, are extended to a point of attachment on the vehicle to be towed. A pair of spacer arms 31, the ends of which are apertured and pivotally attached to the flanges 17 and 18 of the channel member 11 by the pins 19. The other ends of the spacer arms 31 are fastened to the lower bar 28 to provide fixed spacing between the bar 28 and the channel 11 and the support frame 12.

The lifting arm 22 has an apertured extension 32 on its free end to which an I-bolt 33 is fastened. A fastener 34 on the upper bar 27 is engaged in the I-bolt 33, so that the bars 27 and 28 can be raised and lowered by movement of the lifting arm 22 by the piston and cylinder assembly 25.

In use the towing attachment is secured to a vehicle to be towed by chains, not shown, extending from the hooks 30 with a portion of the vehicle resting against the flexible straps 29 to hold the vehicle in spaced relation to the truck 10.

It will be seen that by replacing the conventional bumper on a truck with the channel member 11 that upon placing the support frame 12 against the channel member 11 a flange 12A on the support frame 12 will rest on the channel member 11. The spacing arms 31 are then pivotally attached to the flanges 17 and 18 on the channel member 11 by the pins 19. When the towing attachment is removed from the channel member 11 normal use of the truck is maintained by providing clear access to the truck body.

It will thus be seen that a new and novel towing attachment has been illustrated and described and therefor I claim:

1. A vehicle towing and lifting attachment for use on trucks comprises a vehicle support frame having horizontally spaced vertically extending side members, upper and lower horizontally positioned frame members, a mounting member secured to said truck and means for detachably mounting said frame to said mounting member, a pivoted lifting arm extending from said upper horizontally positioned frame member and means for moving and locking said lifting arm in a desired position, a pair of horizontally disposed spaced parallel bars, one of which is secured to said lifting arm, flexible members interconnecting said bars, spacer arms movably secured to said means for detachably mounting said frame to said mounting member and to the other of said parallel bars.

2. The vehicle towing and lifting attachment of claim 1 wherein said upper and lower horizontally positioned frame members each have an apertured bracket positioned thereon and the means for mounting said lifting arm is pivoted to said apertured bracket on said lower frame member and the lifting arm is pivoted to said apertured bracket on said upper horizontally positioned frame member.

3. The vehicle towing and lifting attachment of claim 1 wherein said means for detachably mounting said vertical frame to said mounting member comprises spaced apertured flanges extending from said mounting member and locking pins engaging apertures in said side members and apertures in said flanges.

4. The vehicle towing and lifting attachment of claim 2 wherein said means for moving said lifting arm comprises an hydraulic piston and cylinder assembly pivotally positioned between said apertured bracket on said lower horizontally positioned frame member and said lifting arm.

5. The vehicle towing and lifting attachment of claim 4 wherein said means for locking said lifting arm is a channel with a bifurcated end pivoted to said lifting arm and engagable against said cylinder of said piston and cylinder assembly when said assembly is extended.

* * * * *